United States Patent Office 2,841,574
Patented July 1, 1958

2,841,574

ANIONIC POLYMERIZATION PROCESS

Walter E. Foster, Baton Rouge, La., assignor to Ethyl Corporation, New York, N. Y., a corporation of Delaware No Drawing. Application February 1, 1954
Serial No. 407,569

10 Claims. (Cl. 260—80)

This invention relates to the manufacture of polymeric materials and more particularly to an improved process for anionic polymerization of polymerizable compounds.

There are three general methods for addition polymerization of unsaturated organic compounds, i. e., free radical, cationic and anionic. The present invention is directed especially to the latter type.

There are a number of different anionic type polymerization methods now known. However, none of these have had any particular commercial success due to inherent difficulties in carrying out the anionic polymerization and particularly due to problems arising from the catalyst system. Of these, the most developed process involves the polymerization of butadiene with sodium. However, there are a number of other polymerization processes of this type which have been disclosed using other forms of sodium catalyst, such as a sodium naphthalene complex in certain ethers; a sodium alkoxide (used in the polymerization of highly polar monomers, e. g., nitro ethylene); Grignard type compounds; and simple organo-alkali compounds. In addition to these, the more recently developed "Alfin" type system comprising a sodium alkenyl compound, a sodium alkoxide and an alkali halide, employed in a hydrocarbon medium, has shown particular activity for certain polymerizations. However, this latter catalyst mixture is uneffective for polymerization of many monomers.

It is accordingly an object of this invention to provide an improved polymerization process. Another object is to provide a process which is adapted to polymerize a wide variety of monomers or comonomers and particularly which is adapted to polymerize monomers with which the conventional "Alfin" type catalyst system is not effective. Still another object is to provide a process which gives a different and improved polymer structure, relative to that obtained with the previously known "Alfin" catalyst system. Another object is to provide a process of the above type which is economical, easily controlled and relatively rapid and a process which employs a substantially homogeneous reaction mixture. Other objects and advantages of the present invention will become apparent from the following description and appended claims.

The present invention is based upon the unexpected discovery that vastly improved results can be realized in carrying out "Alfin" type polymerizations by the use of certain selective solvents as hereinafter more fully described. In accordance with prior practice, polymerizations have been carried out using "Alfin" catalysts in hydrocarbon solvents. Although this prior procedure was somewhat successful in accomplishing certain polymerizations, its utility was limited by the fact that many monomers could not be effectively polymerized in such a system. In contrast to this and in accordance with the present invention, the use of a selective solvent in conjunction with an "Alfin" catalyst extends the utility of the reaction to many monomers which heretofore could not be polymerized with the conventional "Alfin" catalyst. The selective solvents coming within the purview of this invention include certain ethers, acetals, and amines. Although the exact reason for the unexpected improvement obtained by the use of such solvents is not known, it appears that the polymerization is affected by an entirely different reaction mechanism than heretofore experienced with "Alfin" catalysts, and in addition possesses the distinct advantage in that frequently a wholly different molecular structure is obtained in the final polymer product. Thus the present invention not only extends the utility of "Alfin" catalysts in general, but makes possible the preparation of polymers possessing a molecular structure heretofore not realized when using the "Alfin" catalyst.

Ethylenic monomers suitable for polymerization by the process of this invention have the general formula

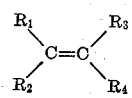

wherein $R_1$, $R_2$, $R_3$ and $R_4$ are members of the group consisting of hydrogen, alkyl, cycloalkyl, aryl, alkaryl, aralkyl, alkoxyalkyl, alkenyl, carboalkoxy, acetyl, cyano; esters, carboxy, amido, aldehydo, alkenyloxy, alkynyl, thienyl, furanyl, tetrahydrofuranyl, pyranyl, and higher heterocyclic groups.

Typical examples of the above radicals for $R_1$, $R_2$, $R_3$ and $R_4$ are methyl, ethyl, propyl, butyl, cyclopentyl, cyclohexyl, phenyl, halogenophenyl, nitrophenyl, tolyl, xylyl, ethylphenyl, benzyl, phenylethyl, methylbenzyl, methoxy, ethoxy, methoxymethyl, ethoxymethyl, vinyl, chlorovinyl, carbomethoxy, carboethoxy, acetyl, propionyl, cyano, formoxy, acetoxy, propionoxy, carboxy, amido, vinyloxy, allyloxy, ethynyl, furanyl, pyridyl, carbazyl, indolyl, indenyl, pyrrolyl, pyrrolidinyl, and pyrrolidonyl.

Other monomers which are also suitable for polymerization are unsaturated cyclic compounds, such as indene, dioxene, dithiene, dioxadiene, coumarone, etc.

Specific examples of suitable monomers for polymerization are ethylene, dienes, such as butadiene, isoprene, 2,3-dimethylbutadiene, dimethyl pentadiene, etc.; halogenated multiolefins such as 2-halogenobutadienes; esters of unsaturated alcohols with mono- and polybasic saturated and unsaturated acids, such as vinyl acetate, diallyl maleate, etc.; esters of saturated alcohols with mono- and polybasic unsaturated acids, such as methyl acrylate, ethyl acrylate, methyl methacrylate, ethyl methacrylate, etc.; unsaturated ethers, such as divinyl ether, diallyl ether, vinyl alkyl ethers, allyl alkyl ethers; unsaturated nitriles such as acrylonitrile, methacrylonitrile, haloacrylonitriles, phenyl acrylonitriles, vinylidene cyanide, etc.; di-N-substituted unsaturated amides, e. g., N,N - dimethylacrylamide, N,N - diethylacrylamide, etc.; unsaturated anhydrides, such as maleic anhydride, etc.; unsaturated ketones, such as divinyl ketone, vinyl alkyl ketone, etc.; unsaturated aldehydes and acetals, such as acrolein and its acetals, methacrolein and its acetals, etc.; unsaturated aromatic compounds, such as divinyl benzene, styrene, mono- and polyhalo styrenes, alkyl styrenes, cyano styrenes, allylbenzene, vinyl naphthalene, etc.; unsaturated heterocyclic compounds, such as vinyl pyridine, vinyl furan, vinyl coumarone, vinyl dibenzofuran, N-vinyl carbazole, etc.; unsaturated alicyclic compounds, such as vinylcyclopentane, vinylcyclohexane, etc.; and unsaturated sulfides, sulfoxides, sulfones, sulfites, sulfates, sulfonates, phosphines, phosphites, phosphates, phosphonates and silanes.

The catalysts useful in accordance with the present invention can be prepared according to the procedure given in an article by Morton et al., J. Am. Chem. Soc. 69, 950 (1947), and other articles of the same author. Briefly, it is prepared by reaction of amyl chloride with sodium, and subsequent reaction of this product with a methyl alkyl carbinol and an olefin, such as propylene. This reaction mixture is then added to a solution of the monomer or monomers to be polymerized in a selective solvent, discussed more completely below. Water and oxygen must be rigidly excluded from the reaction medium. In general, the olefins which are operative are the 2-alkenes and 1-alkenes containing from 3 to 10 carbon atoms. It is not necessary for the organic part of the two components to have the same number of carbon atoms. For most efficient results the two components of the catalyst system should be used in equimolar proportions. However, polymerization can be obtained with up to 4 mols of the alkanol derivative to 1 mol of the olefinic derivative. It is not desirable to use more of the olefinic derivative than the alkanol derivative although a certain amount of polymerization can be obtained with such a mixture.

The concentration of the catalyst is important but not critical and depends largely upon the particular monomer or monomers employed. With monomers such as ethylene, generally lower concentrations are preferred, whereas with styrene, methyl methacrylate and similar higher molecular weight monomers, higher concentrations are preferred. The catalyst concentration determines to some extent the molecular weight of the final product. In some cases, such as with styrene, an increase in catalyst concentration surprisingly gives a higher molecular weight. Although the reaction rate of this polymerization is normally quite high, increased concentration of catalyst does tend to increase even more the rate of reaction.

In general, the catalyst concentration of an equal molecular mixture, i. e. 1 mole of an alkanol derivative to 1 mole of an olefinic derivative, can range between 0.001 and 50 parts per 100 parts of monomer. However, it is preferred to employ between about 0.05–20 parts of equal molecular catalyst per 100 parts of monomer or monomers.

The pressure of the polymerization is not critical for most monomers. However, when polymerizing ethylene, several hundred atmospheres of pressure can be employed. With most monomers atmospheric pressure or a moderate pressure sufficient to maintain a condensed system is preferred.

The solvent suitable for use in the present invention can be selected from the group consisting of ethers, acetals, and tertiary amines. Typical examples of suitable monoether solvents are diethyl ether, diisopropyl ether, dibutyl ether, methyl butyl ether, ethyl butyl ether, methyl propyl ether, ethyl propyl ether, methyl benzyl ether, ethyl benzyl ether, and the like. Polyethers are also suitable and the following are typical examples: ethylene glycol ethers, such as methyl amyl, ethyl amyl, ethyl hexyl, ethyl cetyl, ethyl cyclohexyl, and ethyl benzyl. The diethylene glycols can also be employed in this invention, typical examples being methyl amyl diethylene glycol and ethyl amyl diethylene glycol.

A preferred group of ethers for use in the present invention include both aliphatic mono- and polyethers. The preferred monoethers have a $CH_3$—O— group and have an oxygen:carbon ratio not less than 2:4. Typical examples of these preferred monoethers are dimethyl ether, methyl ethyl ether, methyl isopropyl ether, methyl n-propyl ether or mixtures of these ethers. The above ethers can also be mixed with hydrocarbon solvents, if desired.

The preferred polyethers are ethylene glycol diethers, such as methyl methyl, methyl ethyl, ethyl ethyl, methyl butyl, ethyl butyl, butyl butyl, butyl lauryl; diethylene glycol ethers, such as methyl methyl, methyl ethyl, ethyl butyl and butyl lauryl; trimethylene glycol ethers, such as dimethyl, diethyl, methyl ethyl, etc.; glycerol ethers, such as trimethyl, dimethyl ethyl, diethyl methyl, etc.; and cyclic ethers, such as dioxane, tetrahydrofuran, glycerol formal, methyl glycerol formal, dimethylene pentaerythrite.

A wide variety of acetals can also be used in the present invention. Typical examples of suitable acetals are 1,1-dimethoxy ethane, 1,1-dimethoxy propane, 1,1-dimethoxy butane, benzaldehyde dimethyl acetal, benzaldehyde diethyl acetal, etc. The preferred acetals are ethyl ortho formate, methylal glycol formal and methylal glycerol formal.

A wide variety of tertiary amines are suitable for this invention including both aliphatic and aromatic amines. Typical examples are diethyl methyl amine, triethyl amine, triisopropyl amine, tributyl amine, dimethyl propyl amine and dimethyl aniline. The preferred tertiary amines for use in this invention are trimethyl amine, dimethyl ethyl amine, tetra methyl methane diamine and N-methyl morpholine.

The concentration of solvent is not particularly critical and can range from equal molecular quantities of solvent, based upon the catalyst, to very large excesses of solvent, several times the weight of the monomer or monomers to be polymerized. A more preferred concentration of solvent is from equal parts of solvent and monomer to about 10 parts of solvent per part of monomer.

The temperature of the polymerization of this invention is not particularly critical. In fact, the polymerization can be carried out down to about the freezing point of the reaction mixture (about −140° C.). Elevated temperatures are also suitable although the temperature is normally maintained below 150° C. A preferred temperature range for the polymerization is between about a −100° C. up to about 50° C.

The following are typical examples of polymerization illustrating the process of the present invention but these examples are not to be considered as in any way as limiting the scope of the present invention. All proportions given are on a weight basis.

*Example I*

An "Alfin" catalyst was prepared by reacting 12 parts of sodium dispersed in decane with 27 parts of n-amyl chloride during a period of one hour at 10° C. in 400 parts of dry hexane. The reaction was stirred one hour at 10° C., then 6 parts of isopropyl alcohol was added in 100 parts dry hexane over a period of 10 minutes. Dry propylene gas was then passed through the reaction mixture with vigorous agitation while the solution was maintained at 30° C. for 4 hours. About 8 parts of the resulting catalyst suspension was added to a solution of 10 parts of propenylbenzene in 80 parts of ethylene glycol dimethyl ether. The red reaction mixture was agitated for one and three-quarters hours at 30° C. The catalyst was then deactivated with 15 parts of methanol. The methanol solution was washed with a large quantity of distilled water and the polypropenylbenzene product was dried in a vacuum oven. 5.7 parts of clear colorless polymer was obtained having a softening point slightly above room temperature. The polymer had a molecular weight of 4,300 by cryoscopic analysis.

*Example II*

Example I was repeated except that the ethylene glycol dimethyl ether solvent was substituted by equal quantities of dry hexane solvent. This catalyst system is disclosed in the article by Morton et al. referred to above. However, no polymerization of the propenylbenzene monomer was obtained in this example.

*Example III*

Example I was repeated except that diethylene glycol diethyl ether was employed instead of the ethylene glycol dimethyl ether and in the same proportions. In this example, the polymerization was carried out for 4 hours, instead of one and three-quarters hours. The polymer obtained was a white solid at room temperature which could be compression molded at 190° F. The polymer was obtained in 78 percent yield, based upon the original monomer charged. The molecular weight of this polymer was 4500.

*Example IV*

Example III was repeated except that the reaction was carried out at 0° C. instead of room temperature. In this example a 91 percent yield of polymer was obtained. A white solid was obtained similar to that of Example III. This polymer had a molecular weight of 4500.

*Example V*

Example I was repeated except that about 10 parts of 1,3-butadiene was polymerized and the reaction was carried out for one-half hour. Polybutadiene was obtained in 95 percent yield.

*Example VI*

Example V was repeated, except that diethylene glycol diethyl ether was employed as the solvent in similar proportions. The polymer was again obtained in 95 percent yield and had an intrinsic viscosity of 1.0. This product was compounded with a conventional rubber curing recipe and the cured product was an elastic sheet.

*Example VII*

Example I was repeated except that 20 parts of methyl methacrylate was polymerized. The polymerization was conducted at room temperature for one-half hour. The polymethyl methacrylate product was a white solid and was obtained in 77 percent yield. The polymer had a molecular weight of 2900. The product was molded at 230° C., giving a transparent product.

*Example VIII*

Example III was repeated except that about 11 parts of acrylonitrile was polymerized and the reaction was carried out for one-half hour. Polyacrylonitrile was obtained in 18 percent yield.

*Example IX*

About 40 parts of the catalyst suspension of Example I was added to 300 parts of ethylene glycol dimethyl ether and about 100 parts of ethylene was added at 30° C. and 500 pounds per square inch pressure. The reaction mixture was stirred for one-half hour and then allowed to stand for four days. The pressure was released, removing the unreacted ethylene. The catalyst was destroyed with water and the polyethylene product was recovered by evaporating the solvent. This product melted at 98° C.

As is believed apparent from the above, the present invention provides a means of producing a new and improved polymer composition from a wide variety of monomers including many monomers now commercially employed. More particularly new polymeric compositions of propenyl benzene, butadiene 1,3 and the like, having a different molecular structure, can be produced by the process of this invention. This process also permits the polymerization of many ethylenic monomers which heretofore are inert to polymerization or slightly polymerizable. The products produced in accordance with this invention may be used for films, molded products, fibers, adhesives and similar materials.

I claim:

1. A process which comprises polymerizing an ethylenic monomer in the presence of a catalyst consisting of a sodium alkenyl derived from an aliphatic olefin, a sodium alkoxide derived from methyl alkyl carbinols, and an alkali halide, said polymerization being conducted in the presence of a solvent inert to polymerization selected from the group consisting of ethers, acetals, and tertiary amines, said solvent being present in at least equal molecular quantities, relative to the quantity of said catalyst.

2. The process of claim 1 wherein the solvent is an ether.

3. The process of claim 1 in which the solvent is a polyether.

4. The process of claim 3 wherein the polyether is a glycol ether.

5. The process of claim 1 wherein the solvent is employed in a concentration of about one part to about 10 parts per part of monomer.

6. The process of claim 5 wherein the temperature of the polymerization is between about −100° C. and about 50° C. and the concentration of catalyst is from 0.05 to about 20 parts per part of monomer.

7. The process of claim 6 wherein the ethylenic monomer is a diene.

8. The process of claim 6 wherein the ethylenic monomer is an ester of saturated alcohol with an unsaturated acid.

9. The process of claim 6 wherein the ethylenic monomer is styrene.

10. The process of claim 6 wherein the solvent is an ether.

References Cited in the file of this patent

UNITED STATES PATENTS

| | | |
|---|---|---|
| 2,384,916 | Holmes | Sept. 18, 1945 |
| 2,592,301 | Linville | Apr. 8, 1952 |
| 2,606,179 | Boyd | Aug. 5, 1952 |

OTHER REFERENCES

Morton et al.: J. Am. Chem. Soc. 69, 172–176 (1947).
Simonds et al.: "Handbook of Plastics," second edition (New York: D. Van Nostrand Co., Inc., 1949), 1511 (pages 1029–1033 only needed).